US012119154B2

(12) United States Patent
Fujiwara et al.

(10) Patent No.: US 12,119,154 B2

(45) Date of Patent: Oct. 15, 2024

(54) COIL DEVICE

(71) Applicants: TDK CORPORATION, Tokyo (JP); TDK KOREA CORPORATION, Pyeongtaek-Si (KR)

(72) Inventors: Kiyofumi Fujiwara, Tokyo (JP); Hiroyuki Iwata, Tokyo (JP); Eietsu Abe, Tokyo (JP); Sepung Ki, Gyeonggi-Do (KR); Chihu An, Gyeonggi-Do (KR)

(73) Assignees: TDK CORPORATION, Tokyo (JP); TDK KOREA CORPORATION, Pyeongtaek-Si (KR)

( * ) Notice: Subject to any disclaimer, the term of this patent is extended or adjusted under 35 U.S.C. 154(b) by 685 days.

(21) Appl. No.: 17/209,761

(22) Filed: Mar. 23, 2021

(65) Prior Publication Data

US 2021/0304943 A1 Sep. 30, 2021

(30) Foreign Application Priority Data

Mar. 24, 2020 (JP) ................................. 2020-052784

(51) Int. Cl.

*H01F 27/28* (2006.01)
*H01F 17/04* (2006.01)
*H01F 27/29* (2006.01)

(52) U.S. Cl.

CPC ....... *H01F 17/045* (2013.01); *H01F 27/2823* (2013.01); *H01F 27/292* (2013.01)

(58) Field of Classification Search

CPC .. H01F 17/045; H01F 27/2823; H01F 27/292; H01F 2017/048; H01F 37/00; H01F 27/306; H01F 27/006; H01F 27/24; H01F 27/29

See application file for complete search history.

(56) References Cited

U.S. PATENT DOCUMENTS

| | | | | |
|---|---|---|---|---|
| 5,719,547 | A * | 2/1998 | Kaneko | H01F 27/29 336/183 |
| 2005/0115628 | A1 | 6/2005 | Sasaki et al. | |
| 2006/0071749 | A1 * | 4/2006 | Aoki | H01F 17/045 336/83 |
| 2016/0217919 | A1 * | 7/2016 | Iwata | H01F 27/29 |
| 2017/0062122 | A1 * | 3/2017 | Kanbe | H01F 27/2823 |
| 2017/0169935 | A1 * | 6/2017 | Miyamoto | H01F 19/04 |

(Continued)

FOREIGN PATENT DOCUMENTS

| | | |
|---|---|---|
| JP | 2003-324018 A | 11/2003 |
| JP | 2005-039446 A | 2/2005 |

(Continued)

*Primary Examiner* — Mang Tin Bik Lian

(74) *Attorney, Agent, or Firm* — Oliff PLC

(57) ABSTRACT

The present invention provides a coil device which includes two coil elements in the same device and achieves an improved wire occupancy. The coil device includes a core including a winding core, and a winding wire part of which a first wire and a second wire are wound in a plurality of layers around the winding core, wherein the winding wire part includes a first part in which the first wire and the second wire of a same turn are wound adjacent to each other on a same layer, and a second part in which the first wire and the second wire of a same turn are wound in different layers without being adjacent to each other.

12 Claims, 11 Drawing Sheets

(56) References Cited

U.S. PATENT DOCUMENTS

| | | | | |
|---|---|---|---|---|
| 2018/0158597 | A1* | 6/2018 | Chiu | H01F 27/306 |
| 2018/0211763 | A1* | 7/2018 | Komaya | H01F 27/2828 |
| 2018/0211764 | A1* | 7/2018 | Komaya | H01F 17/04 |
| 2020/0243244 | A1* | 7/2020 | Yoshino | H01F 27/006 |
| 2020/0381169 | A1 | 12/2020 | Komaya et al. | |
| 2021/0012949 | A1* | 1/2021 | Miyamoto | H01F 27/2823 |

FOREIGN PATENT DOCUMENTS

| | | | |
|---|---|---|---|
| JP | 2005-166935 | A | 6/2005 |
| JP | 2006-210827 | A | 8/2006 |
| JP | 2011-253888 | A | 12/2011 |
| JP | 2018-120887 | A | 8/2018 |

* cited by examiner

COIL DEVICE

TECHNICAL FIELD

The present disclosure relates to a coil device, and further specifically the present disclosure relates to a coil device provided with two coil elements in the same coil device.

BACKGROUND

A coil device provided with two coil elements in the same coil device is used in a wide range of fields such as a power inductor, a noise filter, a transformer, and the like. Also, for circuits necessary to correspond to a high current, a coil device which is a type that a wire is wound around a core is preferably used rather than a chip coil which is a multilayer type.

Patent Document 1 proposes a coil device which magnetically combines two coils in the coil device by winding two wires around the core. However, such conventional coil device had a large space in the coil device where wires were not provided particularly near both ends of a winding core. Thus, a wire occupancy in the coil device is low. When the wire occupancy is low, an inductance of the coil device decreases, and in some cases, this may interfere to make the coil device compact.

[Patent Document 1] JP Patent Application Laid Open No. 2003-324018

SUMMARY

The present invention is achieved in view of such circumstances and the object is to provide a coil device provided with two coil elements in the same coil device and to improve a wire occupancy.

In order to achieve in the above object, the coil device according to the present invention includes a core including a winding core, and a winding wire part of which a first wire and a second wire are wound in a plurality of layers around the winding core, wherein the winding wire part includes a first part in which the first wire and the second wire of a same turn are wound adjacent to each other on a same layer, and a second part in which the first wire and the second wire of a same turn are wound in different layers without being adjacent to each other.

The coil device according to the present invention includes the first part in which the first wire and the second wire of a same turn are wound adjacent to each other on a same layer, and the second part in which the first wire and the second wire of a same turn are wound in different layers without being adjacent to each other. Thereby, a space without a wire can be decreased which particularly tends to be formed near both ends of the winding core. Hence, such coil device can improve the wire occupancy and improve the inductance, also it is advantageous from the point of making the coil device more compact.

Also, for example, an inner most layer among the winding wire part contacting the winding core may consists of the first part.

The inner most layer can be wound to the winding core without being influenced by unevenness formed by previously wound wires. Hence, by forming the inner most layer only by the first part, the wire occupancy can be improved.

Also, for example, the winding wire part may include a third part in which the first wire and the second wire of a same turn are wound in a same layer without being adjacent to each other. Also, for example the winding wire part may include a fourth part in which the first wire and the second wire of a same turn are wound adjacent to each other on different layers.

By having the third part and the fourth part in addition to the first part and the second part, the coil device can reduce a space between the wires and a space between a wire and the core. Thus, the wire occupancy can be improved.

Also, for example, one wire among the same turn of the first wire and the second wire in the second part wound to an outer layer may be positioned closer towards a center of the winding core along a coil axis direction than the other wire among the first wire and the second wire of the same turn in the second part wound to a layer towards inner side closer to the winding core than the outer layer.

The other wire wound to the layer towards the inner side is positioned closer to the end part of the winding core away from the center of the coil axis direction, thereby the wire occupancy near the end part of the winding core where a space is relatively easily formed can be improved.

Also, for example, a final turn of the first wire and a final turn of the second wire of the winding wire part may be positioned closer to a winding core second end, which is one end of the winding core in the coil axis direction, than a winding core first end which is other end of the winding core along the coil axis direction and an end of the first wire and an end of the second wire extending from the winding wire part are pulled out to.

By placing the final turn of the first wire and the final turn of the second wire near the winding core second end, the first wire and the second wire pulled out from the winding wire part can contact to a corner of the core by a gentle angle, hence a surface of the wire can be prevented from being damaged.

Also, for example, the final turn of the first wire and the final turn of the second wire may be included in the first part.

By winding the final turn of the first wire and the final turn of the second wire in the same layer while being adjacent to each other, the first wire and the second wire can be easily pulled out to any direction from the winding wire part.

Also, for example, the winding wire part may include a second turn of the first wire which is wound after a first turn of the first wire included in the first part and wound in a second layer closer to the winding core than a first layer included in the first turn of the first wire, and a second turn of the second wire which is wound after a first turn of the second wire being the same turn as the first turn of the first wire in which the second turn of the second wire is wound to the same turn of the first wire in a second layer.

In the winding wire part having the second turn wound after the first turn and positioned at a layer towards inner side, the first wire and the second wire are wound by using slope and unevenness formed by the first wire and the second wire being wound around, thereby the space between the wires and the space between the wires and the core can be reduced. Thus, the wire occupancy can be improved.

Also, for example, at least one of a third turn furthest away from the winding core among the first wire and a fourth turn furthest away from the winding core among the second wire may intercept with a line passing through a center of the winding core along the coil axis direction and perpendicularly to the coil axis direction.

In such coil device, a part of the wire of the winding wire part which is furthest away from the winding core is positioned near the center of the winding core along the coil axis direction, hence the first wire and the second wire are prevented from gathering to one side along the coil axis direction, and improves the wire occupancy.

Also, for example, the winding core may include a center outer circumference face positioned at a center of the coil axis direction of the winding core and extending along the coil axis direction, and a corner end curve extending from the center outer circumference face to the winding core first end which is one end of the winding core in the coil axis direction and also extending from the center outer circumference face to the winding core second end which is the other end of the winding core in the coil axis direction, in which the corner end curve may have a smaller curvature than a curvature of a cross section of the first wire and the second wire perpendicular to a wire extending direction.

As the winding core has such corner end curve, the space between the wires and the space between the wires and the winding core can be reduced, and the wire occupancy can be improved.

Also, for example, the core may include a first flange connecting to the winding core first end which is one end of the winding core along the coil axis direction, and a second flange connecting to the winding core second end which is the other end of the winding core along the coil axis direction.

By using the core including the first flange and the second flange, the space may be easily formed near the first flange and the second flange, however the coil device in which the winding wire part includes the first part and the second part can improve the wire occupancy even when the first flange and the second flange are included.

Also, for example, one wire wound to an outer layer of the same turn among the first wire and the second wire of the second part may be separated from the first flange and the second flange; and the other wire wound to a layer towards inner side closer to the winding core than the outer layer of the same turn among the first wire and the second wire may be connected to the first flange or the second flange.

At the position near the first flange and the second flange, the space where the wire is not provided tends to be easily formed, however when the other wire of the second part contact with the first flange or the second flange, the space is scarcely formed, thus the wire occupancy can be improved.

Also, for example, the first flange may be provided with a first electrode, a second electrode, a third electrode, and a fourth electrode which are insulated against each other, in which the first electrode and the third electrode connected with the first wire may be positioned across one diagonal line of the first flange, and the second electrode and the fourth electrode connected with the second wire may be positioned across other diagonal line of the first flange.

In such coil device, one end of the first wire or the second wire is connected to the electrode at a position which is 180 degrees rotated with respect to the other end, hence the coil device can be produced efficiently using an automatic winding machine.

DETAILED DESCRIPTION

Hereinbelow, the present invention is described based on embodiments shown in figures.

Figure 1:
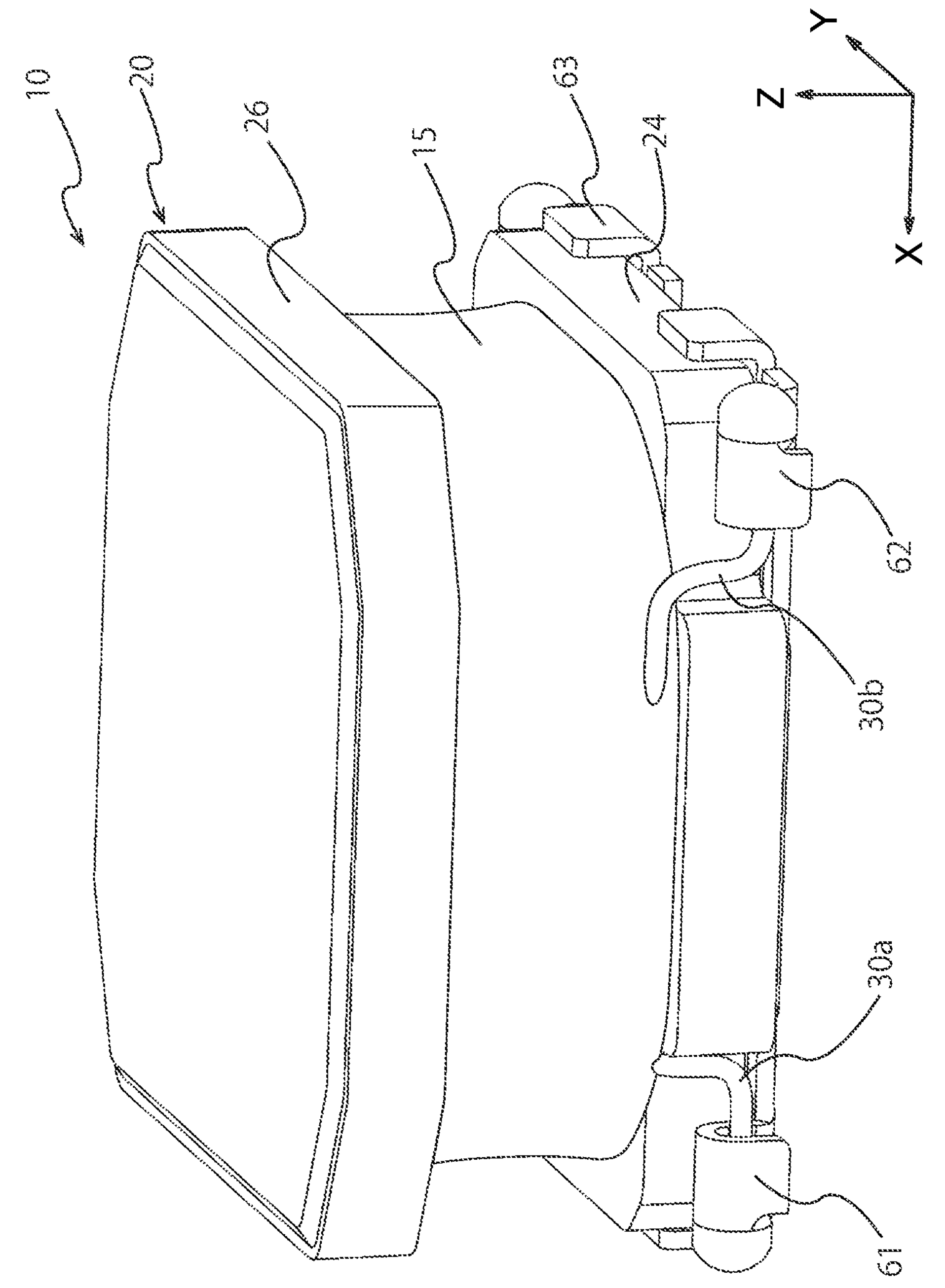
FIG. 1 is a perspective view of a coil device according to one embodiment of the present invention viewing from a position diagonally above the coil device.

FIG. 1 is a perspective view of a coil device 10 according to an embodiment of the present invention viewing from a position diagonally above the coil device. The coil device 10 according to an embodiment of the present invention shown in FIG. 1 to FIG. 8 is for example used as a choke coil, a noise filter, and the like; and particularly preferably it may be an inductor device used for automobiles, and two coil elements are placed in the same coil device 10.

Figure 2:
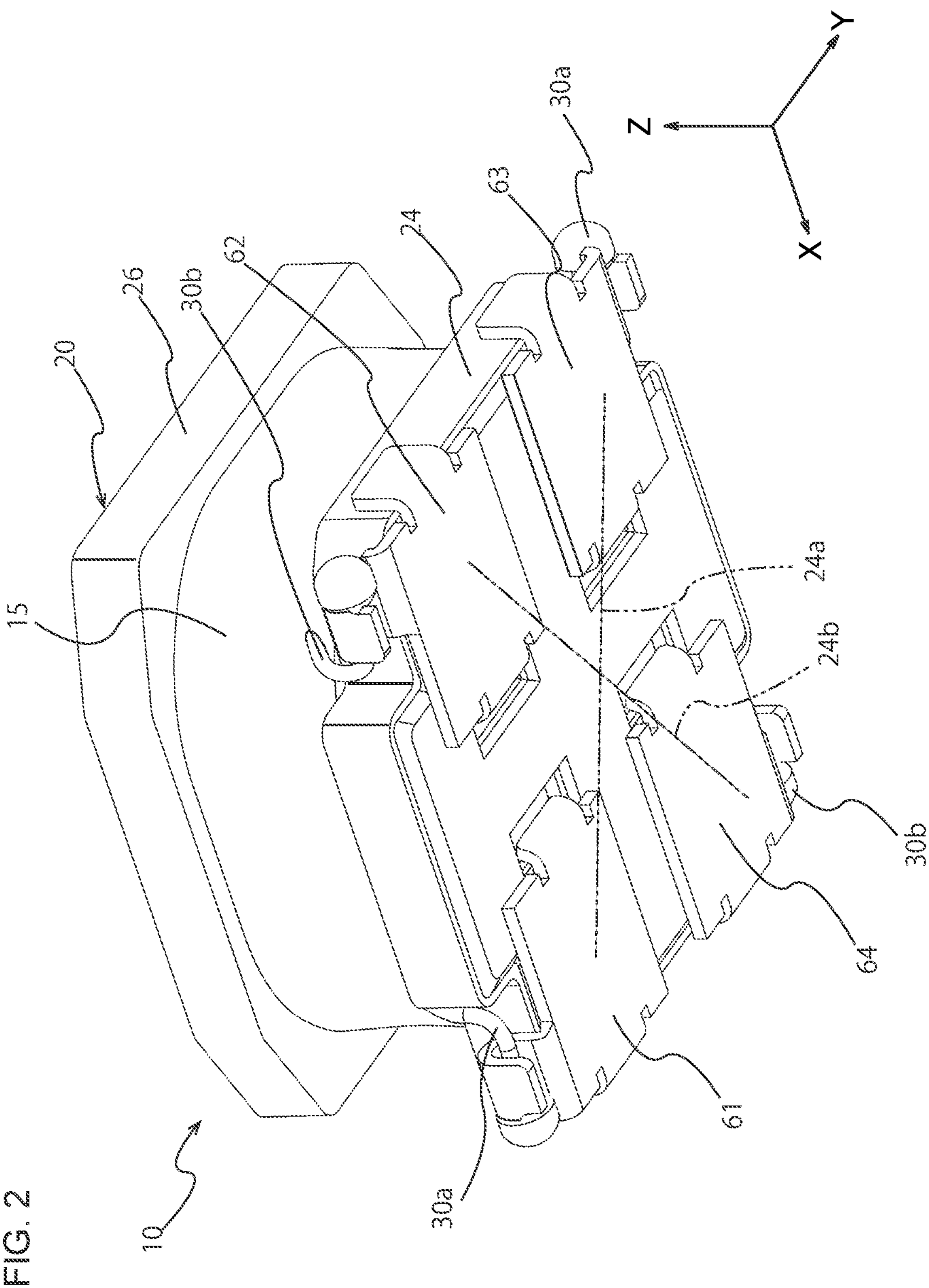
FIG. 2 is a perspective view of the coil device shown in FIG. 1 viewing from a position diagonally below the coil device.
Figure 3A:
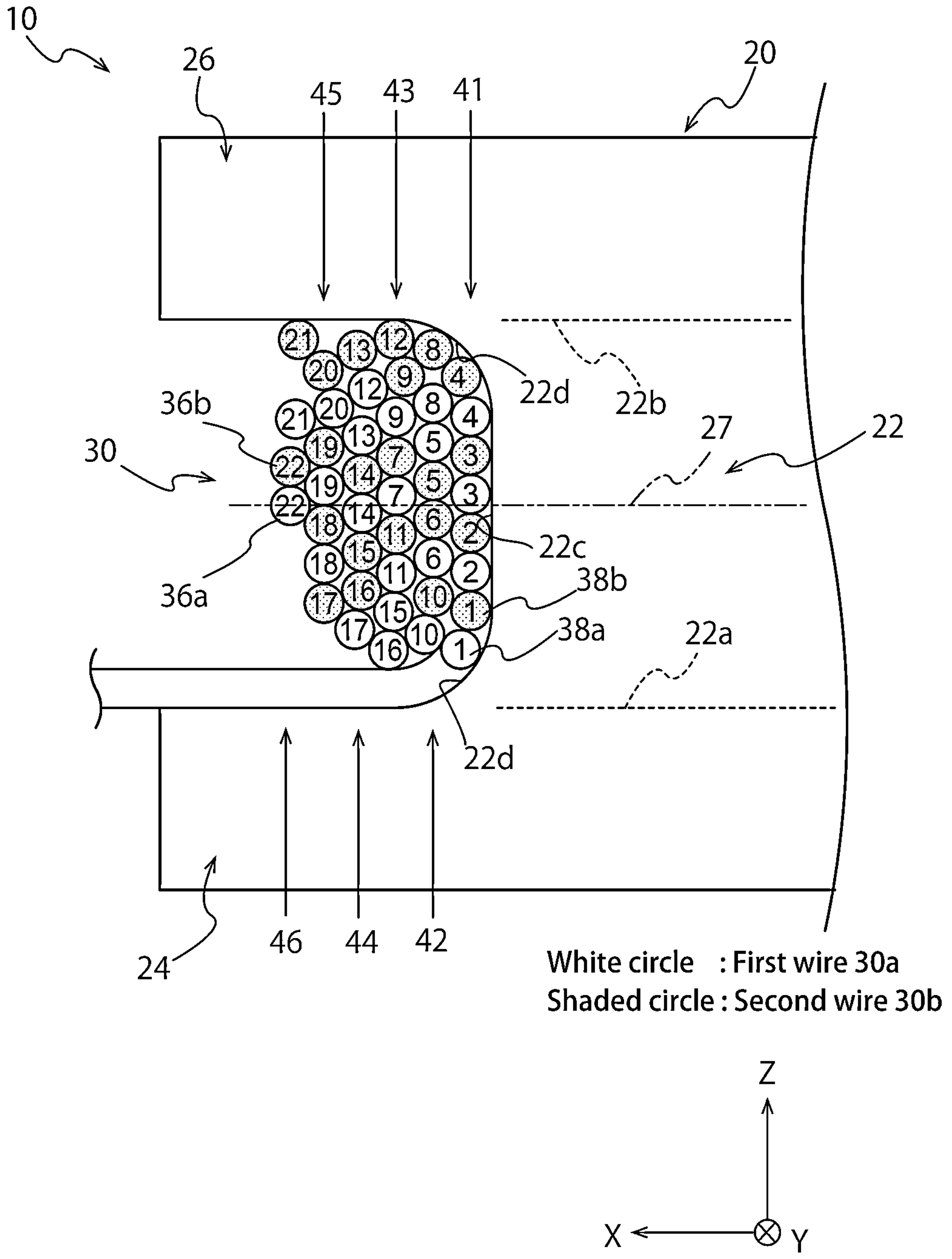
FIGS. 3A-3C are conceptual figures showing a winding wire part formed by a first wire and a second wire included in the coil device shown in FIG. 1.

As shown in FIG. 1, the coil device 10 has a core 20, a resin exterior 15, and a winding wire part 30 covered by the resin exterior 15 (see FIG. 3A). Also, FIG. 2 is a perspective view of the coil device 10 viewing from a position diagonally below the coil device 10. As shown in FIG. 2, the coil device 10 has a first electrode 61, a second electrode 62, a third electrode 63, and a fourth electrode 64.

As shown in FIG. 3A which is a cross section of the coil device 10, the core 20 is a drum core 20 including a winding core 22, a first flange 24, and a second flange 26. A first wire 30*a* and a second wire 30*b* are wound in a plurality of layers around the winding core 22. A shape of the bilateral cross section of the winding core 22 (a cross section in X-Y axis plane) is not particularly limited, and it may be a square cross section, a rectangular cross section, a circular cross section, or it may be any other shape. In the present embodiment, the bilateral cross section is an approximate circular shape (not shown in figures).

As shown in FIG. 3A, the winding core 22 includes a center outer circumference face 22*c* positioned at a center in the coil axis direction of the winding core 22 and extending along the coil axis direction (Z axis direction), and a corner end curve 22*d* extending from the center outer circumference face 22*c* to the winding core first end 22*a* which is one end of the winding core 22 in the coil axis direction, and also extending from the center outer circumference face 22*c* to the winding core second end 22*b* which is the other end of the winding core 22 in the coil axis direction. When a cross section which the coil axis passes through as shown in FIG. 3A is viewed, the center outer circumference face 22*c* extends in a straight line, and the corner end curve 22*d* is curved. The corner end curve 22*d* has a smaller curvature than a curvature of a cross section of the first wire 30*a* and the second wire 30*b* perpendicular to a wire extending direction. As the corner end curve 22*d* has a smaller curvature than a curvature of the wire cross section shown in FIG. 3A, a space formed between the winding core 22 and the first wire 30*a* and the second wire 30*b* can be reduced.

The first flange 24 connects with the winding core first end 22*a* which is one end of the winding core 22 along the coil axis direction (one end at Z axis negative direction). Also, the second flange 26 connects with the winding core second end 22*b* which is the other end of the winding core 22 along the coil axis direction (the other end at Z axis positive direction). Note that, in FIG. 3A to FIG. 9, the resin exterior 15, the electrodes 61 to 64, and the like are not shown in the figures.

The core 20 of the coil device 10 includes the first flange 24 and the second flange 26 as shown in FIG. 1 to FIG. 3A which is preferable from the point of a mounting property of the coil device 10. Note that, the core 20 may be any other form as long as the core 20 includes the winding core 22. Note that, X axis, Y axis, and Z axis used in this description of the coil device 10 are perpendicular to each other; and Z axis coincides with the coil axis direction.

The resin exterior 15 shown in FIG. 1 and FIG. 2 covers the winding wire part 30 shown in FIG. 3A. By covering the winding wire part 30 with the resin exterior 15, the first wire 30*a* and the second wire 30*b* of the winding wire part 30 can be protected effectively, and also a short circuit malfunction and the like can be suppressed. Also, the resin exterior 15 may be preferably constituted by a magnetic material containing resin. By constituting as such, the resin exterior 15 containing the magnetic material becomes a passage of a magnetic field, thus a magnetic property of the coil device 10 improves. The magnetic material included in the resin exterior 15 is not particularly limited, a magnetic powder same as a magnetic powder constituting the core 20, or any other magnetic powder may be mentioned.

As shown in FIG. 2, a lower face of the first flange 24 is provided with the first electrode 61, the second electrode 62, the third electrode 63, and the fourth electrode 64 which are insulated against each other. Both ends of the first wire 30*a* are connected to the first electrode 61 and the third electrode 63, and both ends of the second wire 30*b* are connected to the second electrode 62 and the fourth electrode 64.

The first electrode 61 and the third electrode 63 to which the first wire 30*a* is connected are positioned across one diagonal line 24*a* of the first flange 24; and the second electrode 62 and the fourth electrode 64 to which the second wire 30*b* is connected are positioned across the other diagonal line 24*b* of the first flange 24. In such coil device 10, one end of the first wire 30*a* and second wire 30*b* are connected to the electrode at a position 180 degrees rotated with respect to the other end, hence the coil device can be produced efficiently using an automatic winding machine.

The first to fourth electrodes 61 to 64 are formed using a conductive metal plate. A material of the conductive metal plate is not particularly limited, and tough-pitch copper, phosphor bronze, brass, iron, nickel, and the like may be mentioned. For example, the first to fourth electrodes 61 to 64 may be constituted by a material other than the conductive metal plate such as a plating layer, a paste layer, a thin film or the like made of silver, tin, and the like.

The both ends of the first wire 30*a* and the second wire 30*b* are connected to the first to fourth electrodes 61 to 64 by a laser welding. Note that, a method of connecting the first wire 30*a* and the second wire 30*b* to the first to fourth electrodes 61 to 64 is not limited to a laser welding, and other methods such as heat compression adhesion, fusing, soldering, and the like may be used.

The first wire 30*a* and the second wire 30*b* forming the winding wire 30 shown in FIG. 3A are not particularly limited, and for example a conductive wire such as a rectangular wire, a solid wire, a stranded wire, a litz wire, a braded wire, and the like may be mentioned, or a wire of which these conductive wires are insulation coated can be used. Specifically, known wires such as AIW (polyimide wire), UEW (polyurethane wire), UEW, USTC, and the like can be used. A wire diameter of the first wire 30*a* and the second wire 30*b* is not particularly limited, and for example it may be 0.1 to 0.5 mm. The wire diameter and the material of two wires 30*a* and 30*b* may be same or different.

Figure 3B:
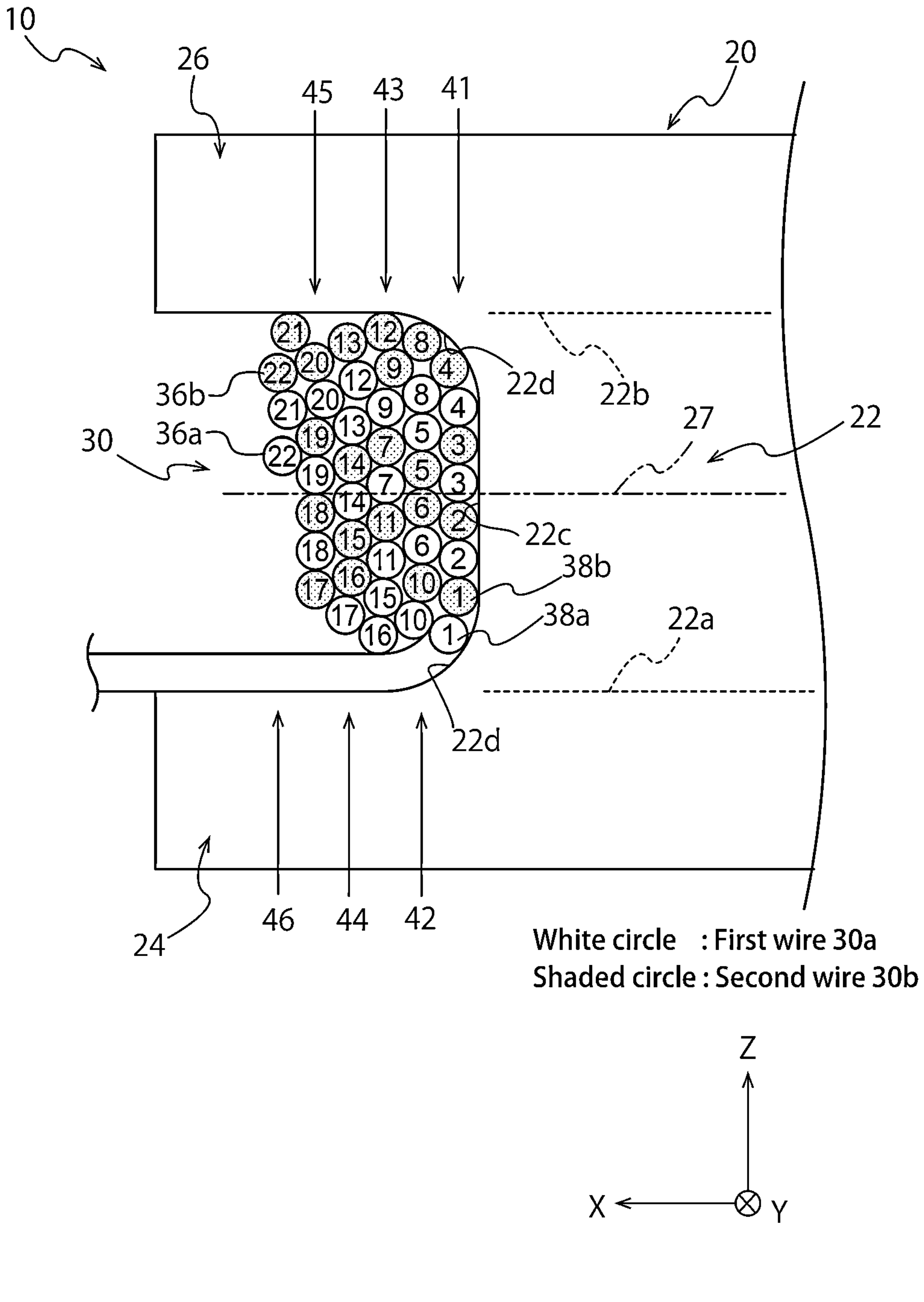
Figure 3C:
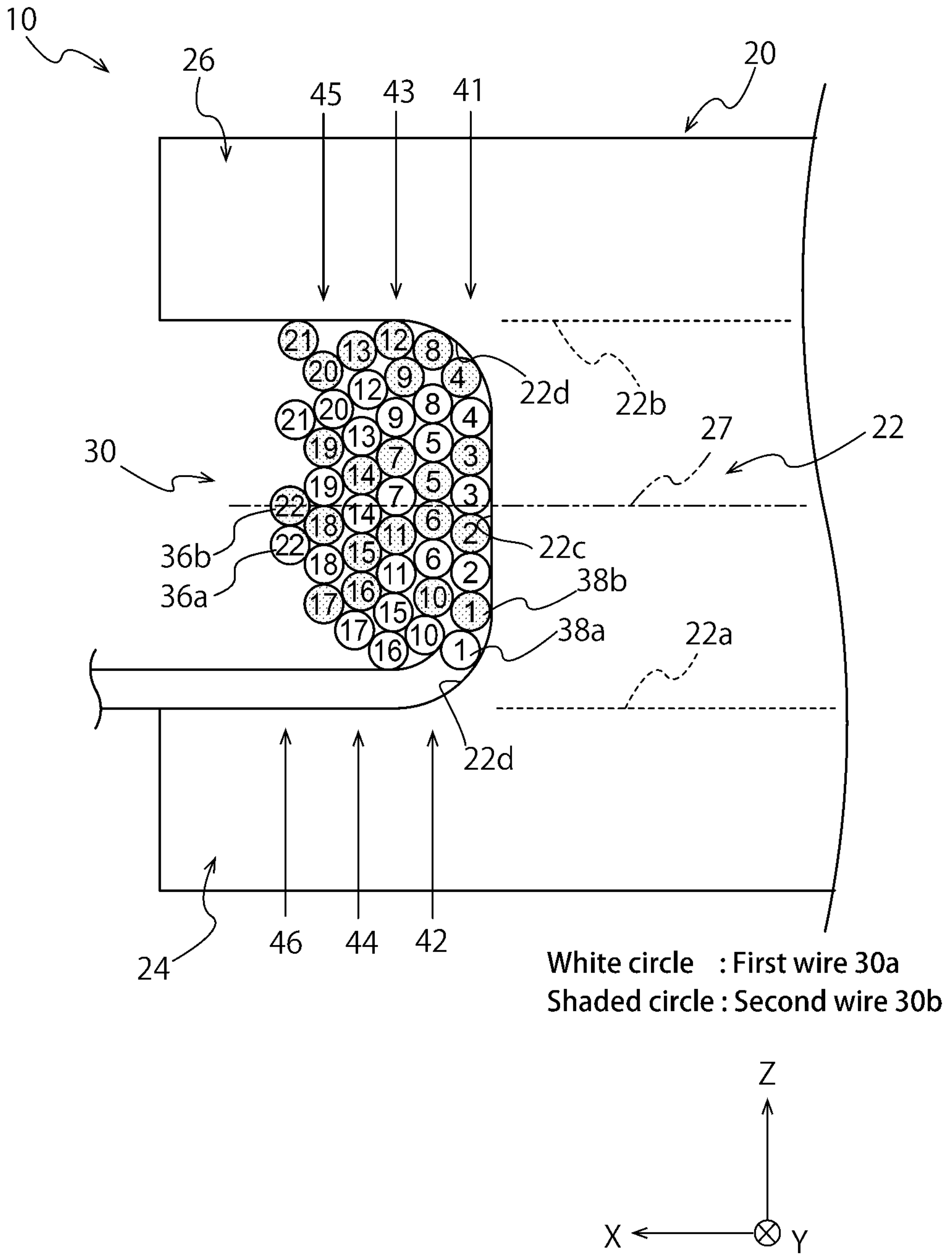

FIGS. 3A-3C are conceptual figures showing a winding state of the first wire 30*a* and the second wire 30*b* of the winding wire part 30, and also shows the cross section of the core 20 and the winding wire part 30. A white circle shown in the winding wire part 30 represents the first wire 30*a*, and a shaded circle shown in the winding wire part 30 represents the second wire 30*b*. Also, a number shown in the circle shows the number of turn made by the first wire 30*a* and the second wire 30*b*. For example, the circle indicated with number "1" represents the first turn of the first wire 30*a* and the second wire 30*b* (a first turn 38*a* of the first wire 30*a* and a first turn 38*b* of the second wire 30*b*); and the circle indicated with number "22" represents the twenty second turn which is the end turn of the first wire 30*a* and the second wire 30*b* (a twenty second turn 36*a* of the first wire 30*a* ad a twenty second turn 36*b* of the second wire 30*b*).

The winding wire part 30 shown in FIG. 3A is formed by winding the first wire 30*a* and the second wire 30*b* at the same time by a method for forming the winding wire part 30 of the coil device 10 which is described in below. The first wire 30*a* and the second wire 30*b* are magnetically combined in the coil device 10.

As shown in FIG. 3A, the winding wire part 30 is formed by winding the first wire 30*a* and the second wire 30*b* in six layers, and a number of turns of the first wire 30*a* and the second wire 30*b* are both 22 turns. A number of layers and a number of turns of the winding wire part 30 included in the coil device 10 are not particularly limited as long as the first wire 30*a* and the second wire 30*b* are wound in a plurality of layers. Also, a number of turns of the first wire 30*a* and the second wire 30*b* may be preferably the same or it may be different.

Figure 4:
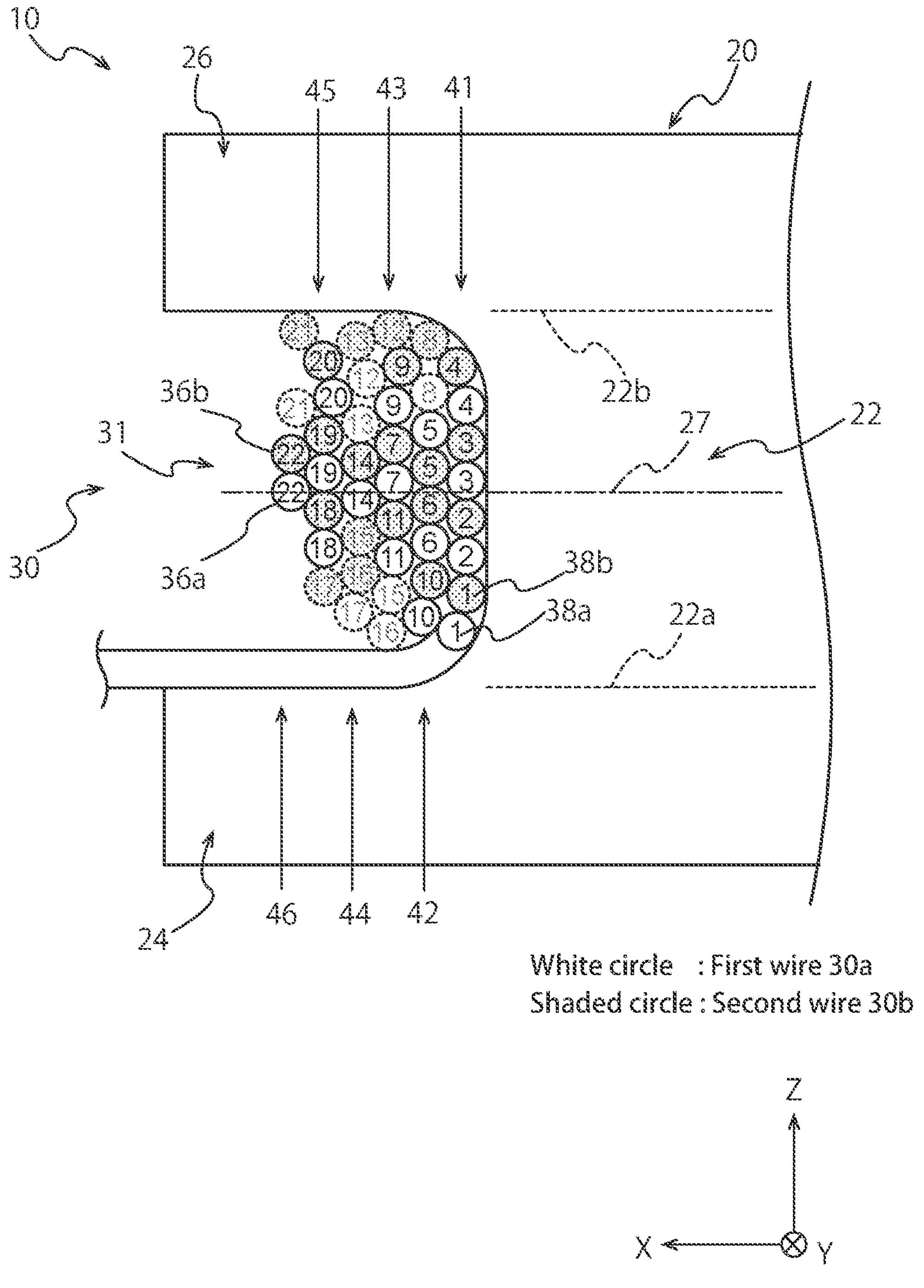
FIG. 4 is a conceptual figure emphasizing a first part of the winding wire part shown in FIG. 3A.
Figure 5:
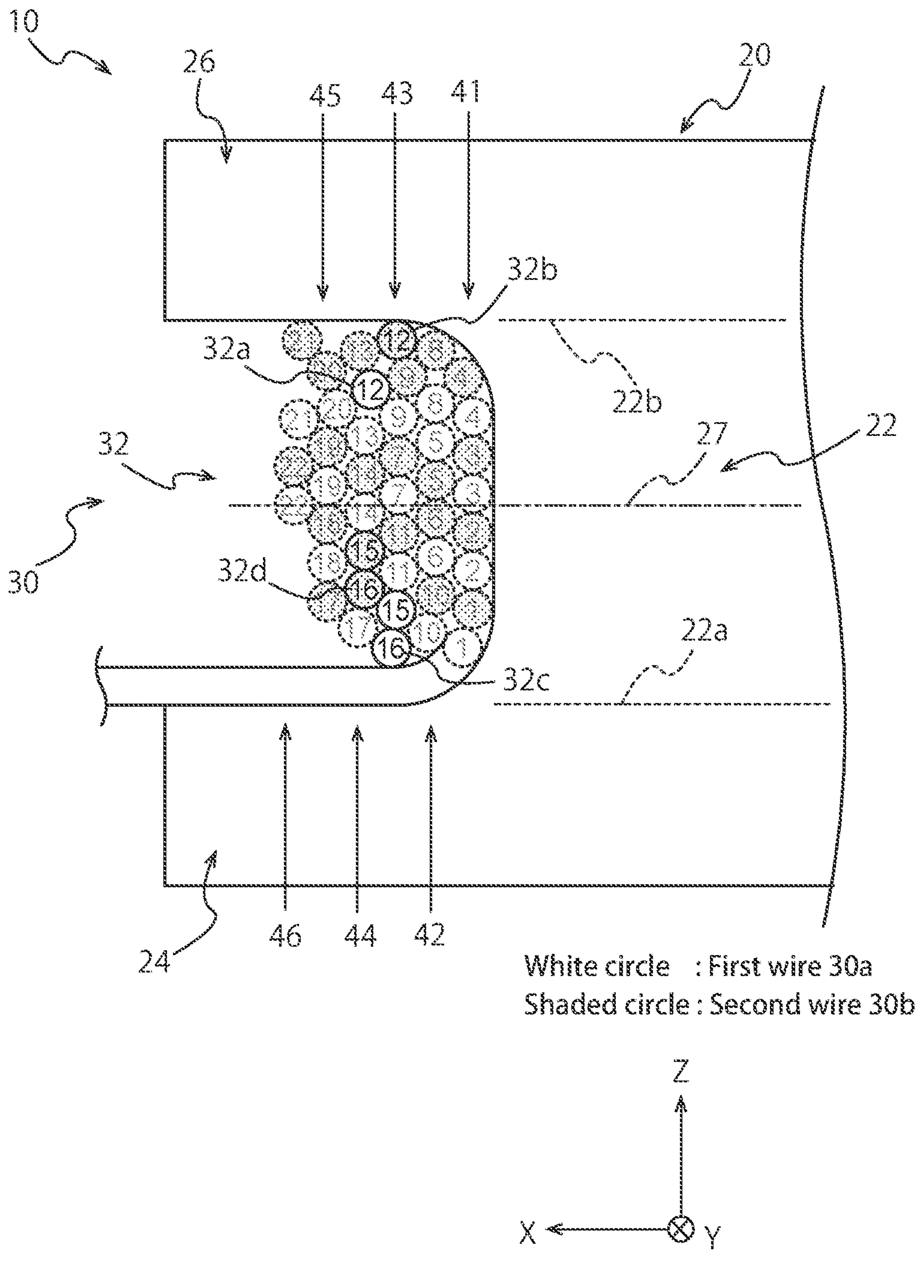
FIG. 5 is a conceptual figure emphasizing a second part of the winding wire part shown in FIG. 3A.
Figure 6:
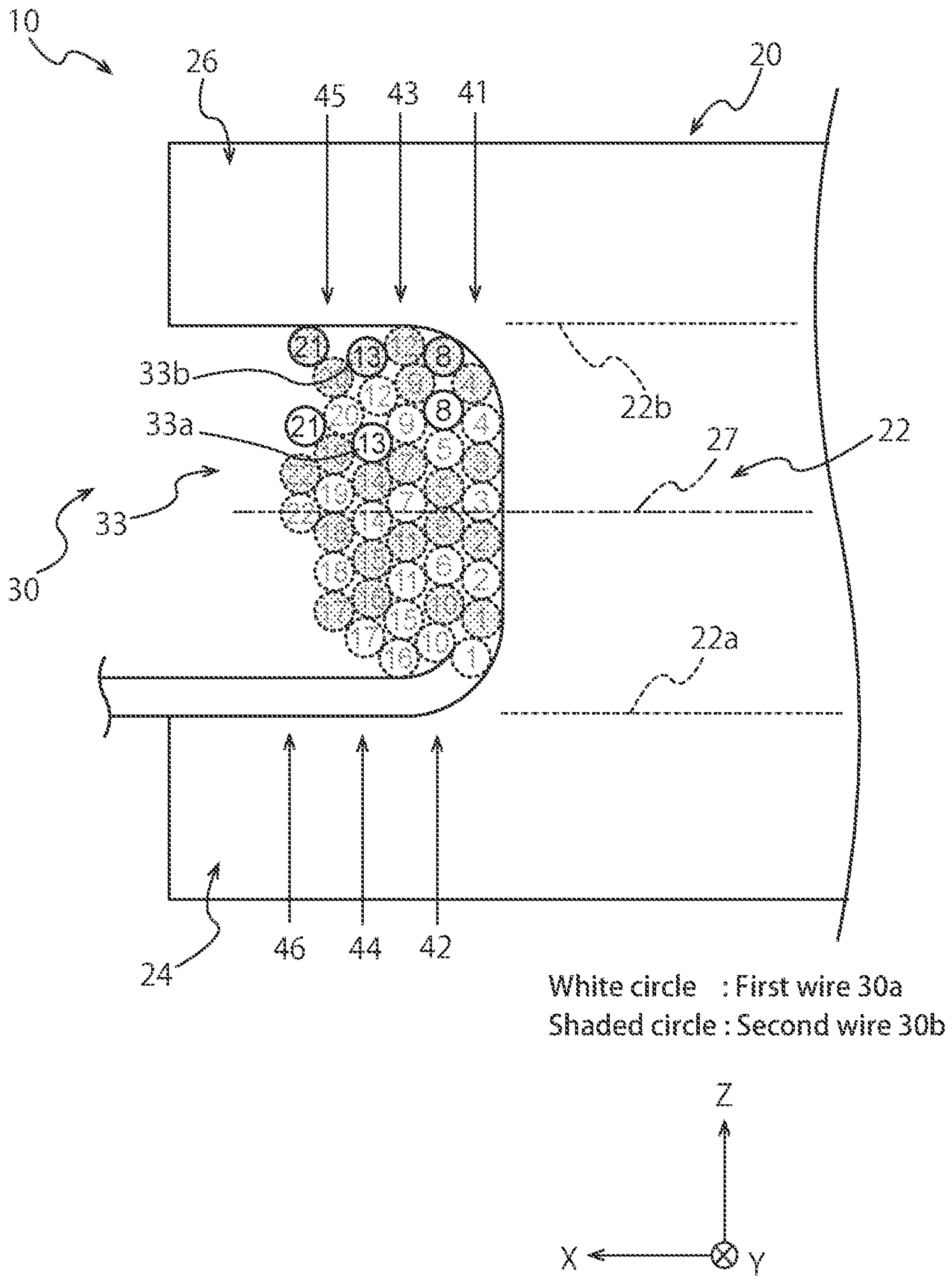
FIG. 6 is a conceptual figure emphasizing a third part of the winding wire part shown in FIG. 3A.
Figure 7:
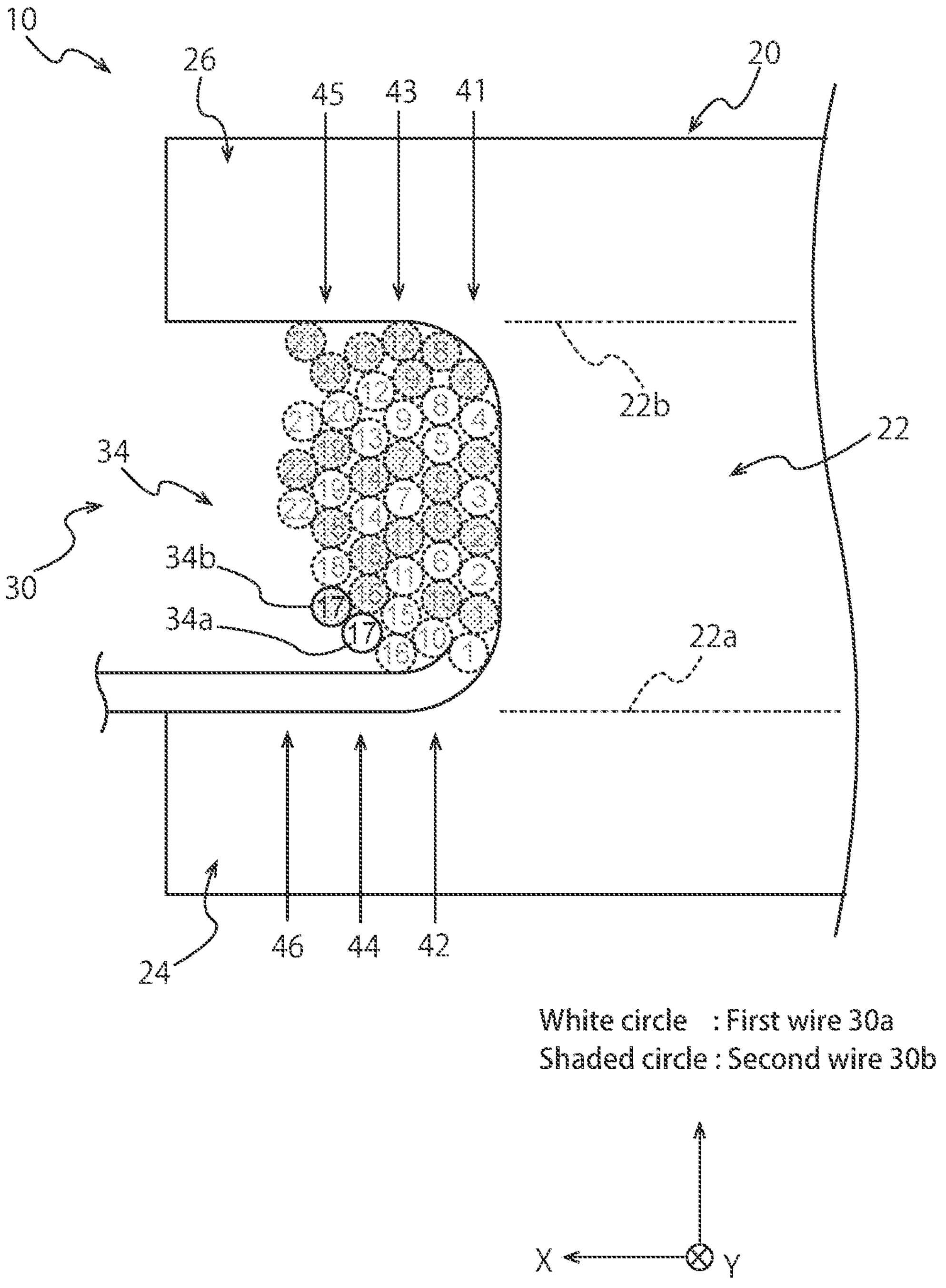
FIG. 7 is a conceptual figure emphasizing a fourth part of the winding wire part shown in FIG. 3A.

The winding wire part 30 shown in FIG. 3A includes a first part 31 shown in FIG. 4, a second part 32 shown in FIG. 5, a third part 33 shown in FIG. 6, and a fourth part 34 shown in FIG. 7. In FIG. 4, the first part 31 of the winding wire part 30 shown in FIG. 3A is shown in a solid line (emphasized) and other parts 32 to 34 of the winding wire part 30 are shown in a broken line.

As shown in FIG. 4, in the first part 31, the first wire 30*a* and the second wire 30*b* of the same turn are wound adjacent to each other in the same layer. As shown in FIG. 4, the first turn to seventh turn, the ninth turn to the eleventh turn, the fourteenth turn, the eighteenth turn to the twentieth turn, and the twenty second turn constitute the first part 31. As the first part 31, the first turn 38*a* of the first wire 30*a* and the first turn 38*b* of the second wire 30*b*, the twenty second turn 36*a* of the first wire 30*a* and the twenty second turn 36*b* of the second wire 30*b*, and the like may be mentioned.

The first part 31 occupies most ratio among the four parts included in the winding wire part 30. The ratio of the first part 31 is large particularly at a part close to the winding core 22, and at a part close to a center line 27 which passes through the center of the winding core 22 in the coil axis direction and intercepts perpendicularly with the coil axis direction. Particularly, the first layer 41 which is the inner most layer of the winding wire part 30 contacting the winding core 22 is consisted of the first part 31. The first layer 41 which is the inner most layer is not influenced by the inner layers when the wires are wound, hence it is preferable to constitute only by the first part 31 and the fourth part 34 (see FIG. 7) from the point of increasing the wire occupancy, and more preferably it is constituted only by the first part 31. Note that, the first layer 41 which is the inner most layer may include part of the second part 32 (see FIG. 5).

In FIG. 5, the second part 32 of the winding wire part 30 shown in FIG. 3A is shown in a solid line (emphasized), and other parts 31, 33, and 34 of the winding wire part 30 are shown in a broken line. As shown in FIG. 5, in the second part 32, the first wire 30*a* and the second wire 30*b* of the same turn are wound in different layers without being adjacent to each other.

As shown in FIG. 5, the twelfth turn, the fifteenth turn, and the sixteenth turn constitute the second part 32. As the second part 32, the first turn 32*a* of the first wire 30*a* and the twelfth turn 32*b* of the second wire 30*b* shown in FIG. 5, the sixteenth turn 32*c* of the first wire 30*a* and the sixteenth turn 32*b* of the second wire 30*b*, and the like may be mentioned.

For example, the sixteenth turn 32*c* of the first wire 30*a* is positioned at the third layer 43, the sixteenth turn 32*d* of the second wire 30*b* is positioned at the fourth layer 44, hence these are wound in different layers. Also, as shown in FIG. 3A or FIG. 5, the fifteenth turn and the seventeenth turn of the first wire 30*a* are placed between the sixteenth turn 32*c* of the first wire 30*a* and the sixteenth turn 32*d* of the second wire 30*b*, and these are not adjacent to each other and do not contact with each other.

Also, in the second part 32, one wire wound to the outer layer among the first wire 30*a* and the second wire 30*b* of the same turn is positioned closer to the center of the winding core 22 in the coil axis direction than the other wire wound to a layer towards inner side closer to the winding core 22 in a coil axis direction than the outer layer among the first wire 30*a* and the second wire 30*b* of the same turn. For example, in the second part 32, the twelfth turn 32*a* of the first wire 30*a* wound to the fourth layer 44 which is a layer at outer side is positioned closer to the center line 27 with respect to the coil axis direction of the wining core 22 than the twelfth turn 32*b* of the second wire 30*b* wound to the third layer 43 which is a layer at inner side.

One wire wound to a layer at outer side in the second part 32 is positioned further away from the center line 27 with respect to the coil axis direction than the other wire wound to a layer at inner side. Thereby, this effectively prevents a space from forming to the area where the wires are not formed near the first flange 24 and the second flange 26. The fifteenth turn and the sixteenth turn 32*c* and 32*d* of the second part 32 also satisfies such relationship. Note that, this relationship does not necessarily have to be satisfied by all of the parts included in the second part 32, and only part of the second part 32 may satisfy this relationship.

Also, in the second part 32 shown in FIG. 5, one wire wound to a layer at outer side among the first wire 30*a* and the second wire 30*b* of the same turn may be spaced apart from the first flange 24 and the second flange 26; and the other wire wound to a layer at inner side closer to the winding core than an outer layer among the first wire 30*a* and the second wire 30*b* may contact with the first flange 24 and the second flange 26. For example, in the second part 32, the twelfth turn 32*a* of the first wire 30*a* wound to the fourth layer 44 which is a layer at outer side is spaced apart from the first flange 24 and the second flange 26; and the twelfth turn 32*b* of the second wire 30*b* wound to the third layer 43 which is a layer at inner side is contacting the second flange 26. Thereby, the twelfth turn 12*b* of the second wire 30*b* fills the space formed between the second flange 26 and the wires 30*a* and 30*b*. Furthermore, other wires such as the ninth turn, the thirteenth turn, and the like of the second wire 30*b* fill the space formed between the twelfth turn 32*a* of the first wire 30*a* and the twelfth turn 32*b* of the second wire 30*b*. Thereby, a space is prevented from forming near the second flange 26.

In FIG. 6, the third part 33 of the winding wire part 30 shown in FIG. 3A is indicated with a solid line (emphasized), and other parts 31, 32, and 34 of the winding wire part 30 are indicated with a broken line. As shown in FIG. 6, in the third part 33, the first wire 30*a* and the second wire 30*b* of the same turn are wound in the same layer without being adjacent to each other.

As shown in FIG. 6, the eighth turn, the thirteenth turn, and the twenty first turn constitute the third part 33. As the third part 33, the thirteenth turn 33*a* of the first wire 30*a*, the thirteenth turn 33*b* of the second wire 30*b*, and the like shown in FIG. 6 may be mentioned.

For example, the thirteenth turn 33*a* of the first wire 30*a* is positioned at the fourth layer 44, and the thirteenth turn 33*b* of the second wire 30*b* is positioned at the fourth layer 44, hence these are wound in the same layer. Also, the twelfth turn of the first wire 30*a* and the twentieth turn of the second wire 30*b* are placed between the thirteenth turn 33*a* of the first wire 30*a* and the thirteenth turn 33*b* of the second wire 30*b*, hence these are not adjacent to each other and do not contact with each other.

In FIG. 7, the fourth part 34 of the winding wire part 30 shown in FIG. 3A is indicated with a bold line (emphasized), and other parts 31 to 33 of the winding wire part 30 are shown with a broken line. As shown in FIG. 7, in the fourth part 34, the first wire 30*a* and the second wire 30*b* of the same turn are wound adjacent to each other in different layers.

As shown in FIG. 7, as the fourth part 34, the seventeenth turn 34*a* of the first wire 30*a* and the seventeenth turn 34*b* of the second wire 30*b* may be mentioned. The seventeenth wire 34*a* of the first wire 30*a* is positioned in the fourth layer 44, and the seventeenth layer 34*b* of the second wire 30*b* is positioned in the fifth layer 45, thus these are wound in different layers. Also, the seventeenth turn 34*a* of the first wire 30*a* and the seventeenth turn 34*b* of the second wire 30*b* are adjacent to each other and are in contact with each other.

Figure 9:
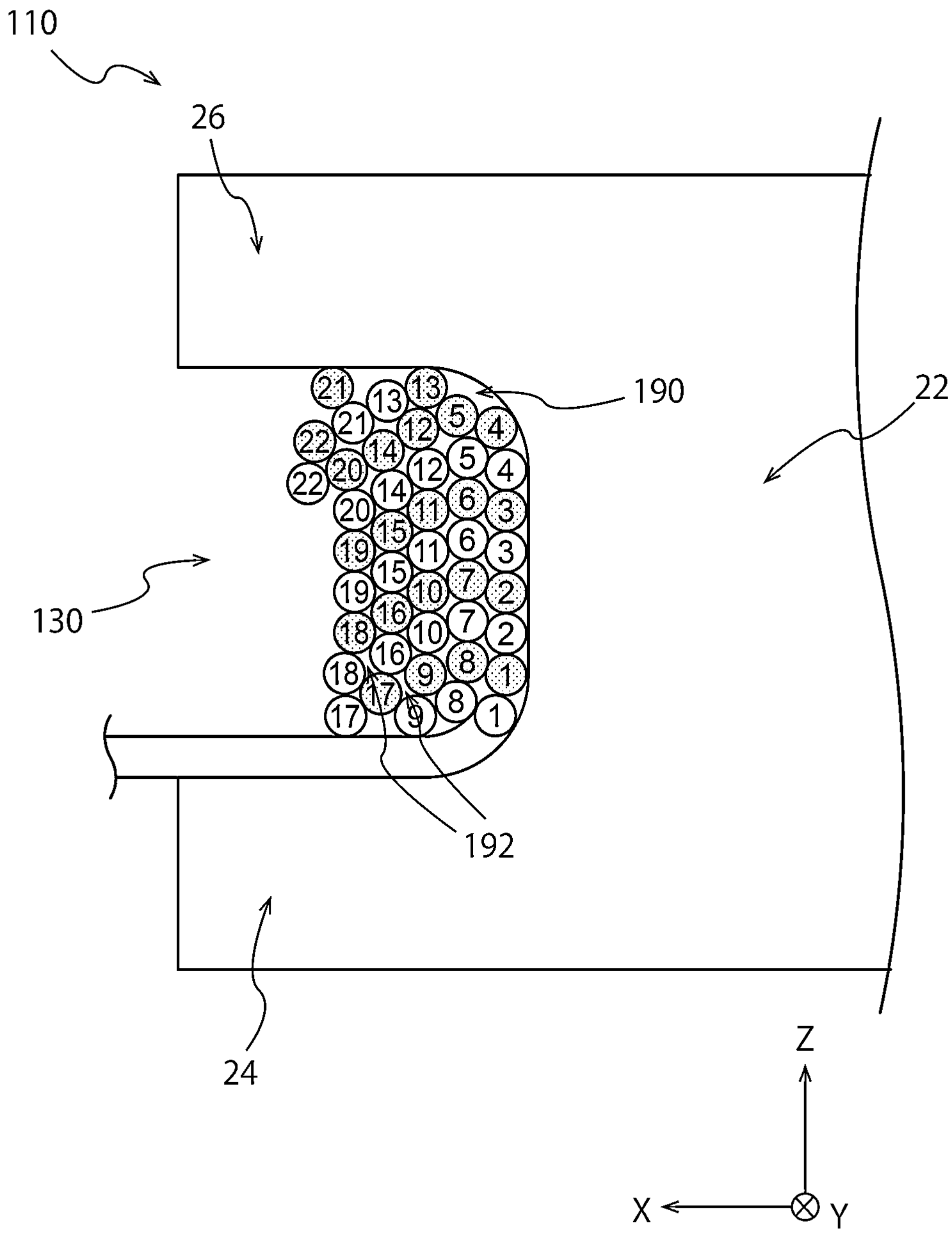
FIG. 9 PRIOR ART
FIG. 9 is a conceptual figure showing a winding state of the first wire and the second wire included in the coil device according to a reference example.

FIG. 9 is a cross section in a winding state of the coil device 110 according to a reference example. The coil device 110 includes a core 20 same as the coil device 10, and a winding wire part 130 of which the first wire 130*a* and the second wire 130*b* are wound at the same time.

In the winding wire part 130 shown in FIG. 9, the first wire 130*a* and the second wire 130*b* are wound in a manner that the same turns are always in contact with each other. The winding wire part 130 includes only two parts which are a first part in which the first wire 130*a* and the second wire 130*b* of the same turn are wound in the same layer and being adjacent each other; and a fourth part in which the first wire 130*a* and the second wire 130*b* of the same turn are adjacent to each other in different layers. Such winding wire part 130 may form a relatively large space (void) 190 to an area without the first wire 130*a* and the second wire 130*b* such as an area between the second layer and the second flange 26. Also, the winding wire part 130 tends to have a space 192 in many places around the seventeenth turn and the eighteenth turn near the first flange 24.

On the other hand, the winding wire part 30 shown in FIG. 3A includes the third part 33 shown in FIG. 6 and the second part 32 shown in FIG. 5, thereby a space between the first wire 30*a* and the second wire 30*b* and a space between the wires 30*a* and the core are reduced, and improves the wire occupancy.

That is, the winding wire part 30 shown in FIG. 3A has the second part 32 and the third part 33 in which the first wire 30*a* and the second wire 30*b* of the same turn do not contact with each other, thereby enables to reduce the space formed when the winding wire part 130 is formed by winding the first wire 130*a* and the second wire 130*b* in a manner that these are always in contact as shown in FIG. 9, and the wire occupancy can be improved.

Also, as shown in FIG. 5, the second part 32 of the winding wire 30 has a structure of which only one wire of the same turn is positioned to inner side (to a layer at inner side) at the both ends along the coil axis direction of the predetermined layer (the third layer 43) as shown by the twelfth turn 32*b* of the second wire 30*b* and the sixteenth turn 32*c* of the first wire 30*a*. In the coil device 10 having such structure, the first wire 30*a* and the second wire 30*b* are prevented from being damaged by pressed against the first flange 24 and the second flange 26, and also the space being formed between the flanges 24 and 26 with the wires 30*a* and 30*b* can be prevented.

Regarding the coil device 10, when the winding wire part 30 is formed, either one of the first wire 30*a* and the second wire 30*b* is naturally positioned to the space formed between the flanges 24 and 26 with the wires 30*a* and 30*b* along unevenness formed by the wires of the below layers. Therefore, when the winding wire part 30 is formed to the coil device 10, a force pulling the wires 30*a* and 30*b* along the coil axis direction can be decreased, the damage to the wires 30*a* and 30*b* can be prevented which is caused by the wires 30*a* and 30*b* contacting the first flange 24 or the second flange 26 or by the wires 30*a* and 30*b* wearing off against the first flange 24 or the second flange 26.

Hereinbelow, the structure of the coil device 10 is explained in further detail by using examples of a method of producing the coil device 10 and a method of forming the winding wire part 30. However, the method of producing the coil device 10 and the method of forming the winding wire part 30 are not limited thereto.

At the first step of forming the winding wire part 30 of the coil device 10 shown in FIG. 1, first the core 20 provided with the first to fourth electrodes 61 to 64 is set to the automatic winding machine. The core 20 is formed for example by compression molding, CIM (ceramic injection molding), MIM (metal injection molding), and the like, and if necessary, firing is performed; thereby the core 20 is produced. Also, the first to fourth electrodes 61 to 64 are for example fixed to the core 20 by adhesion and the like. Note that, a method for forming the core 20, and a method for fixing the first to fourth electrodes 61 to 64 are not limited thereto.

Next, to the core 20 set to the automatic winding machine, the first wire 30*a* and the second wire 30*b* are contacted to a winding start position of the winding core 22 to begin winding by using a nozzle to guide the first wire 30*a* and the second wire 30*b* as shown in FIG. 3A.

Next, the automatic winding machine rotates the core 20 while the nozzle pulls the first wire 30*a* and the second wire 30*b*, thereby the first wire 30*a* and the second wire 30*b* are wound from the first turn to the twenty second turn in this order as shown in FIG. 3A. Thereby, the winding wire part 30 is formed. As shown in FIG. 4, the first turn to eleventh turn are included in the first part 31 except for the eighth turn.

Figure 8:
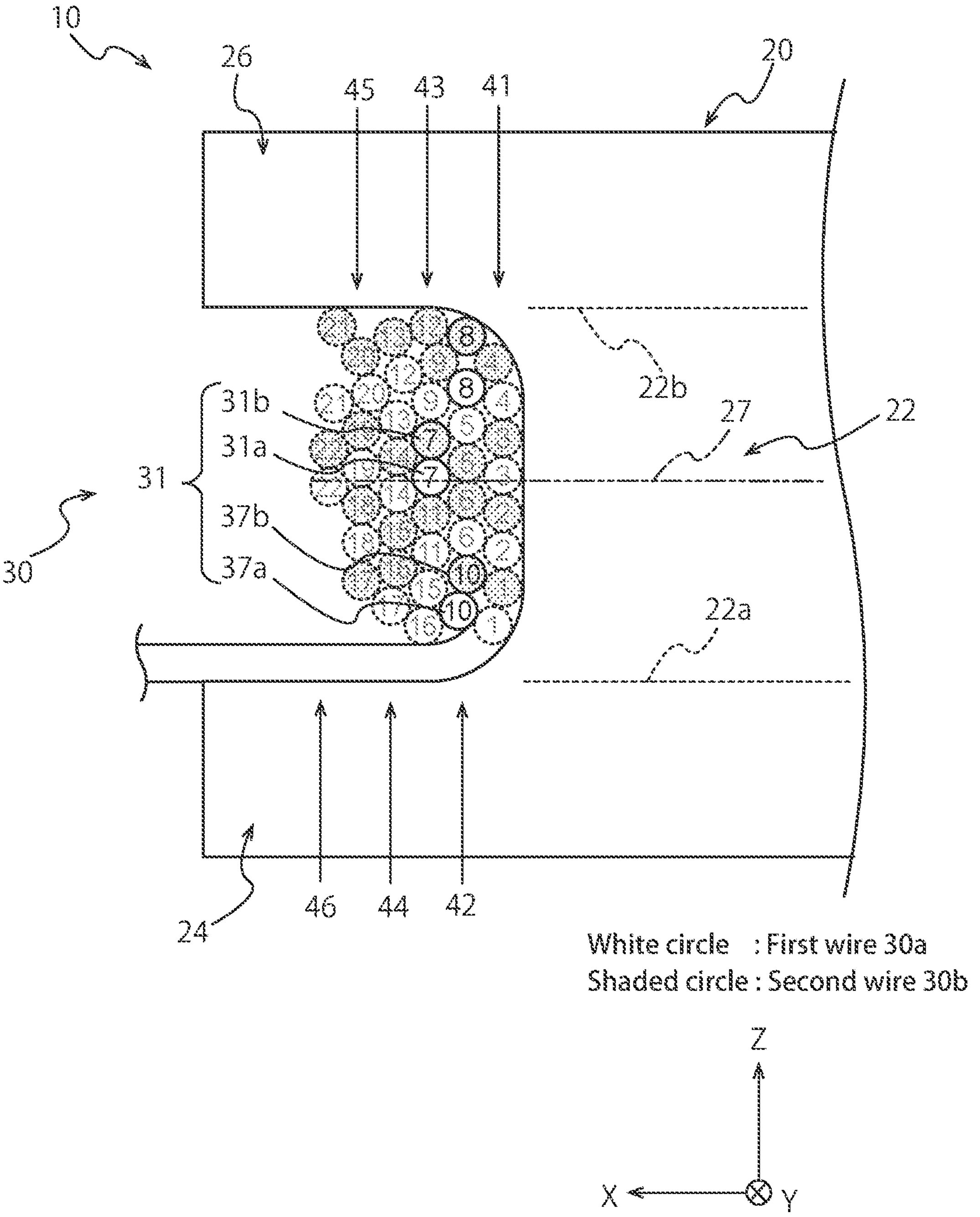
FIG. 8 is a conceptual figure emphasizing part of the winding wire part shown in FIG. 3A.

Here, unlike the winding wire part 130 shown in FIG. 9, the winding wire part 30 shown in FIG. 3A does not form the first layer 41 at inner side to the sixth layer 46 at outer side, but rather part of the layers at the outer side is formed prior to the layer at the inner side. FIG. 8 is a conceptual figure of FIG. 3A which emphasizes part of the winding wire part 30 shown in FIG. 3A.

As shown in FIG. 8, the winding wire part 30 includes the tenth turn 37*a* as the second turn of the first wire 30*a* wound after the seventh turn 31*b* as the first turn of the first wire 30*a* included in the first part 31; and the tenth turn 37*a* as the second turn of the first wire 30*a* is wound in the second layer 42 as the second layer which is closer to the winding core 22 than the third layer 43 as the first layer including the seventh turn 31*b* of the first wire 30*a*. Also, the winding wire part 30 includes the tenth turn 37*b* of the second wire 30*b* wound after the seventh turn 31*b* of the second wire 30*b* which is the same turn as the seventh turn 31*b* of the first wire 30*a*, and the tenth turn 37*b* of the second wire 30*b* is wound in a second layer 42 which is the second layer of the same turn as the tenth turn 37*a* of the first wire 30*a*.

Also, as shown in FIG. 8, the seventh turn 31*a* and 31*b* as the first turn of the first wire 30*a* and the second wire 30*b* are positioned closer to the center (closer to the center line 27) with respect to the coil axis direction of the winding core 22 than the tenth turn 37*a* and 37*b* as the second turn of the first wire 30*a* and the second wire 30*b*. The seventh turn 31*a* and 31*b* of the first wire 30*a* and the second wire 30*b*, and the eighth turn of the first wire 30*a* and the second wire 30*b* also satisfy a similar relationship.

As shown in FIG. 8, the winding wire part 30 is formed by first forming a pyramid form around the center with respect to the coil axis direction of the winding core 22, and then the both end sides of the coil axis direction of the winding core 22 is formed. Thereby, the wires 30*a* and 30*b* constituting the turns formed at the both end sides afterwards (the tenth turn and the eighth turn) are guided to fall into the space formed between the turns already formed in a pyramid form and the flanges 24 and 26. Hence, such coil device 10 can reduce the space formed between the flanges 24 and 26 and the wires 30*a* and 30*b*.

Further, at the both ends of the third layer 43, the second part 32 is formed as shown in FIG. 4, thereby a space formed between the flanges 24 and 26 and the wires 30*a* and 30*b*, and a space between the wires 30*a* and 30*b* can be reduced. Thus, the wire occupancy of the wires 30*a* and 30*b* can be improved (the twelfth turn to the seventeenth turn).

Also, as shown in FIGS. 3A and 3B, the twenty second turn 36*a* as the final turn of the first wire 30*a* and the twenty second turn 36*b* as the final turn of the second wire 30*b* in the winding wire part 30 are both positioned closer to the winding core second end 22*b* which is one end of the winding core 22 along the coil axis direction than the winding core first end 22*a* which is the other end of the winding core 22 along the axis direction to which the ends of the first wire 30*a* and the second wire 30*b* extending from the winding wire part 30 are pulled out.

Thereby, the twenty second turn 36*a* and 36*b* as the final turn of the first wire 30*a* and the second wire 30*b* are provided away from the winding core first end 22*a* connecting to the first flange 24 to which the electrodes 61 to 64 are provided. Therefore, the first wire 30*a* and the second wire 30*b* which are pulled out towards the electrodes 61 to 64 can decrease the angle of bending when the wires contact the first flange 24, and also the damage of the first wire 30*a* and the second wire 30*b* caused when the wires contact with the flange 24 can be prevented.

Also, as shown in FIG. 3A and FIG. 4, the twenty second turn 36*a* as the final turn of the first wire 30*a* and the twenty second turn 36*b* as the final turn of the second wire 30*b* are included in the first part 31. The twenty second turn 36*a* of the first wire 30*a* and the twenty second turn 36*b* of the second wire 30*b* are in contact with each other, hence both of the twenty second turn 36*a* and 36*b* of the first wire 30*a* and the second wire 30*b* can be greatly spaced away from the first flange 24.

Also, as shown in FIGS. 3A and 3C, at least one of the twenty second turn 36*a* as the third turn furthest away from the winding core 22 among the first wire 30*a* and the twenty second turn 36*b* as the third turn furthest away from the winding core 22 among the second wire 30*b* intercepts with the center line 27 which passes through the center of the winding core 22 in the coil axis direction and perpendicularly crosses with the coil axis direction.

In such coil device 10, a part where the winding wire part 30 forms the most layers is formed to a center part in the coil axis direction that is at a position spaced away from the first flange 24 and the second flange 26. Therefore, such coil device 10 can reduce the number of layers formed to the outer circumference of the winding core first end 22*a* and the winding core second end 22*b* close to the first flange 24 and the first flange 26, and the space between the wires 30*a* and 30*b* and the space between the core 20 and the wires 30*a* and 30*b* can be reduced, furthermore the wire occupancy of the wires 30*a* and 30*b* can be improved.

When the twenty second turn 36*a* and 36*b* of the winding wire part 30 are formed as shown in FIG. 3A, the nozzle pulls out the ends of the first wire 30*a* and the second wire 30*b* to the first flange 24. Then, both ends of the first wire 30*a* are fixed to the first electrode 61 and the third electrode 63; and the both ends of the second wire 30*b* are fixed to the second electrode 62 and the fourth electrode 64. Note that, one end of the first wire 30*a* and the second wire 30*b* may be fixed or temporarily fixed to the electrodes 61 to 64 before the winding wire part 30 is formed.

Lastly, to the outer circumference of the winding wire part 30, the resin exterior 15 shown in FIG. 1 and FIG. 2 is formed and the resin exterior 15 covers the winding wire part 30, thereby the coil device 10 shown in FIG. 1 to FIG. 8 is obtained.

As shown in FIG. 3A to 8, the coil device 10 according to the present invention includes the first part 31 in which the first wire 30*a* and the second wire 30*b* of the same turn are wound adjacent to each other in the same layer, and also includes the second part 32 in which the first wire 30*a* and the second wire 30*b* of the same turn are wound in different layers without being adjacent to each other. In such coil device 10, the space which tends to be formed near the both ends of the winding core 22 where the wires 30*a* and 30*b* are not formed can be reduced. Therefore, such coil device 10 can improve the wire occupancy, and also the inductance can be improved. Also, it is advantageous from the point of making the coil device compact.

Hereinabove, the coil device according to the present invention is described based on the embodiments, however the scope of the present invention is not limited to the embodiments described in above, and other various embodiments and modifications are also included. For example, as shown in FIG. 3A, in the coil device 10, the starting position of winding is at the first flange 24 side, however the present invention is not limited thereto, and winding may be started from the second flange 26 side.

NUMERICAL REFERENCES

10, 110 . . . Coil device
15 . . . Resin exterior
20 . . . Core
22 . . . Winding core
22*a* Winding core first end
22*b* . . . Winding core second end
22*c* . . . Center outer circumference face
22*d* . . . Corner end curve
24 . . . First flange
24*a*, 24*b* . . . Diagonal line
26 . . . Second flange
27 . . . Center line
30, 130 . . . Winding wire part
30*a*, 130*a* . . . First wire
30*b*, 130*b* . . . Second wire
31 . . . First part
31*a*, 31*b* . . . First turn (first turn)
37*a*, 37*b* . . . Tenth turn (second turn)
32 . . . Second part
32*a* . . . Twelfth turn of the first wire 30*a* (one wire)
32*b* . . . Twelfth turn of the second wire (other wire)
32*c* . . . Sixteenth turn of the first wire 30*a* (other wire)
32*d* . . . Sixteenth turn of the second wire 30*b* (one wire)
33 . . . Third part
33*a*, 33*b* . . . Thirteenth turn
34 . . . Fourth part
34*a*, 34*b* . . . Seventeenth turn
36*a* . . . Twenty second turn of the first wire 30*a* (third turn)
36*b* . . . Twenty second turn of the second wire (fourth turn)
41 . . . First layer (inner most layer)
42 . . . Second layer
43 . . . Third layer
44 . . . Fourth layer
45 . . . Fifth layer
46 . . . Sixth layer
61 . . . First electrode
62 . . . Second electrode
63 . . . Third electrode
64 . . . Fourth electrode
190, 192 . . . Space

What is claimed is:

1. A coil device comprising
a core including a winding core, and
a winding wire part of which a first wire and a second wire are wound in a plurality of layers around the winding core, wherein
the winding wire part includes
a first part in which the first wire and the second wire of a same turn are wound adjacent to each other on a same layer,
a second part in which the first wire and the second wire of a same turn are wound in different layers without being adjacent to each other, and
a third part in which the first wire and the second wire of a same turn are would in a same layer without being adjacent to each other, and
an inner most layer of the winding wire part contacting the winding core consists of the first part.

2. The coil device according to claim 1, wherein the winding wire part includes a fourth part in which the first wire and the second wire of a same turn are wound adjacent to each other on different layers.

3. The coil device according to claim 1, wherein, in the second part, one wire of the first wire and the second wire wound in an outer layer is positioned closer to a center of the winding core in a coil axis direction than the other wire among the first wire and the second wire in an inner layer closer to the winding core than the outer layer.

4. The coil device according to claim 1, wherein a final turn of the first wire and a final turn of the second wire of the winding wire part are positioned closer to a winding core second end which is one end of the winding core in a coil axis direction than a winding core first end which is other end of the winding core in the coil axis direction; and an end of the first wire and an end of the second wire extending from the winding wire part are pulled out to the winding core first end.

5. The coil device according to claim 4, wherein the final turn of the first wire and the final turn of the second wire are included in the first part.

6. The coil device according to claim 1, wherein the winding wire part includes a second turn of the first wire which is wound after a first turn of the first wire included in the first part and wound in a second layer closer to the winding core than a first layer included in the first turn of the first wire, and a second turn of the second wire which is wound after a first turn of the second wire being the same turn as the first turn of the first wire in which the second turn of the second wire is wound to the same turn as the second turn of the first wire in a second layer.

7. The coil device according to claim 6, wherein the first turn of the first wire is positioned closer to a center of the winding core in the coil axis direction than the second turn of the first wire, and the first turn of the second wire is positioned closer to the center of the winding core in the coil axis direction than the second turn of the second wire.

8. The coil device according to claim 1, wherein at least one of a third turn furthest away from the winding core among the first wire and a fourth turn furthest away from the winding core among the second wire intercept with a line passing through a center of the winding core in the coil axis direction and perpendicularly to the coil axis direction.

9. The coil device according to claim 1, wherein the winding core includes a center outer circumference face positioned at a center of the coil axis direction of the winding core and extending in the coil axis direction, and a corner end curve extending from the center outer circumference face to a winding core first end which is one end of the winding core in the coil axis direction and also extending from the center outer circumference face to a winding core second end which is the other end of the winding core in the coil axis direction, in which the corner end curve has a smaller curvature than a curvature of a cross section of the first wire and the second wire perpendicular to a wire extending direction of the first wire and the second wire.

10. The coil device according to claim 1, wherein the core includes a first flange connecting to a winding core first end which is one end of the winding core in the coil axis direction, and a second flange connecting to a winding core second end which is the other end of the winding core in the coil axis direction.

11. The coil device according to claim 10, wherein one wire wound in an outer layer of the same turn among the first wire and the second wire of the second part is separated from the first flange and the second flange, and the other wire wound in an layer towards inner side closer to the winding core than the outer layer of the same turn among the first wire and the second wire is connected to the first flange or the second flange.

12. The coil device according to claim 10, wherein the first flange is provided with a first electrode, a second electrode, a third electrode, and a fourth electrode which are insulated against each other, in which the first electrode and the third electrode connected with the first wire are positioned across one diagonal line of the first flange, and the second electrode and the fourth electrode connected with the second wire are positioned across the other diagonal line of the first flange.

* * * * *